B. F. KNOBLOCH.
ATTACHING DEVICE FOR NON-SKID CHAINS.
APPLICATION FILED FEB. 21, 1918.
1,290,579.  Patented Jan. 7, 1919.
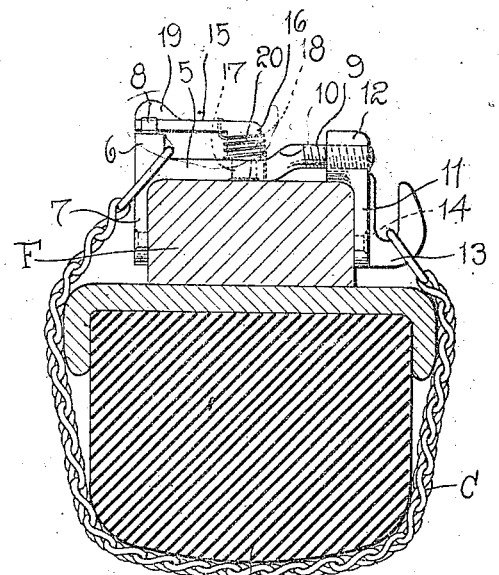
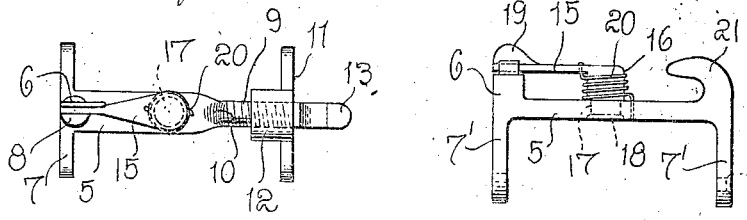
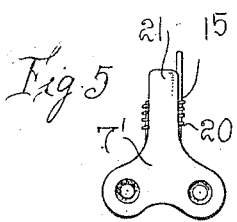
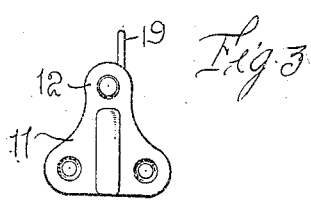
Inventor
Barney F. Knobloch
By Watson E. Coleman
Attorney

UNITED STATES PATENT OFFICE.

BARNEY F. KNOBLOCH, OF PITTSBURGH, PENNSYLVANIA.

ATTACHING DEVICE FOR NON-SKID CHAINS.

1,290,579.

Specification of Letters Patent. Patented Jan. 7, 1919.

Application filed February 21, 1918. Serial No. 218,535.

*To all whom it may concern:*

Be it known that I, BARNEY F. KNOBLOCH, a citizen of the United States, residing at Pittsburgh, in the county of Allegheny and State of Pennsylvania, have invented certain new and useful Improvements in Attaching Devices for Non-Skid Chains, of which the following is a specification, reference being had to the accompanying drawings.

This invention relates to an improved fastening attachment for non-skid chains and has for its primary object to provide a simple, effective and reliable device adapted to be secured to the felly of a vehicle wheel and to which the ends of the tread chain extending transversely across the wheel tire can be easily and quickly connected or disconnected.

It is another object of the invention to provide an attachment for the above purpose which can be easily and quickly applied in operative position upon the wheel felly, and the several parts of which are so constructed and arranged that the attachment will be subjected to a minimum strain in the tractive engagement of the tread chain with the road surface.

It is also another important object of my invention to provide an attaching means for non-skid chains which can be readily adjusted and rendered adaptable to wheel fellies of different widths. As a specific item of improvement, I contemplate the provision in a device for the above purpose, of an easily operable latch arm which is adapted to coact with a part of the device to retain the chain in operative connection therewith, the latch arm being so located, that it is not liable to be accidentally displaced from its effective position whereby the chain will be released.

And the invention also has for a further general object, to provide a non-skid chain attaching device for vehicle wheels, which is exceedingly simple in its construction, very strong and durable and capable of manufacture at comparatively small cost.

With the above and other objects in view the invention consists in the improved combination, construction and arrangement of the several parts as will be hereinafter more fully described, subsequently claimed and illustrated in the accompanying drawings, in which similar reference characters designate corresponding parts throughout the several views and wherein:

Figure 1 is a transverse sectional view through the tire and felly of the vehicle wheel illustrating one embodiment of the invention and showing a tread chain in its applied position on the wheel tire;

Fig. 2 is a plan view of the attachment;

Fig. 3 is an end elevation;

Fig. 4 is a view similar to Fig. 1 illustrating a slightly modified form of the device; and Fig. 5 is an end elevation of the device shown in Fig. 4.

Referring in detail to the drawing and more particularly to Figs. 1, 2 and 3 thereof, 5 designates the body bar which is generally of rectangular form in cross section and is provided upon one of its ends with an integral cylindrical lug 6 projecting at right angles from one side face of the bar. 7 designates the integral attaching flange on the said end of the bar 5 which projects from the bar in an opposite direction with respect to the lug 6. This cylindrical lug 6 is further provided at one side thereof with a longitudinally extending stop projection 8, the purpose of which will hereinafter become apparent.

The bar 5 at its other end is formed into a cylindrical threaded rod 9 which is offset with relation to the plane of the body bar 5, as indicated at 10 and extends longitudinally in parallel relation therewith. A second attaching plate 11, preferably, though not necessarily of the form shown in Fig. 3 is provided upon one of its ends with a cylindrical boss 12 projecting laterally from one face of said plate and having a threaded bore to receive the threaded rod or extension 9 of the bar 5. Upon the outer side face of the plate 11, a hook shaped laterally projecting lug 13 is integrally formed, the bill of the hook extending in parallel relation to the plane of the plate 11 and projecting toward the threaded rod 9. The plate 11 and the flange 7 are each provided with spaced openings to receive suitable attaching screws, indicated at 14 whereby said plate and flange may be securely fixed to the opposite side faces respectively of the wheel felly indicated at F.

15 indicates a latch arm which is provided upon one of its ends with a cylindrical part 16 projecting at right angles to the plane of said arm. The extremity of this cylindrical portion of the latch arm is reduced in diameter as shown at 17 and rotatably mounted in an opening provided in the body bar 5, the end face of this reduced portion of the part 16 being hammered or swaged as shown at 18 whereby the latch arm is permanently held in operative connection with the body bar. The arm 15 extends in parallel relation to the bar 5 and on its other or free end is formed with a suitable finger piece 19 adjacent to one longitudinal edge of the arm. The other edge of said arm is normally held yieldingly in contact with the inner side face of the projection 8 by means of the coil spring 20 which surrounds the vertical part 16 of the latch arm and has one of its ends secured to said arm, the other end of the spring being fixed in the bar 5.

In the use of the attachment, the body bar 5 extends transversely across the inner face of the wheel felly, and the flange 7 and plate 11 are secured to the side faces of the felly, as above stated. Thus the lug 6 and the hook shaped lug 13 will project radially in an inward direction with respect to the felly of the wheel. The device may be readily adjusted in accordance with the width of the wheel felly by axially turning the plate 11 upon the threaded rod 9. In applying the attachment to wheels having a narrow felly, the projected end portion of the rod 9 may be cut off by means of a metal saw. In applying the non-skid chain, one terminal link is engaged in the hook shaped lug 13 at the inner side of the wheel, and said chain shown at C is then extended transversely across the tread of the wheel tire T and the free end of the latch arm is forced away from the projection 8 by pressing with the finger against the web or flange 19. The other terminal link of the chain is then engaged over the lug or post 6 and upon the release of the arm, the spring 20 immediately returns the arm to its normal position in engagement with the projection 8, thereby preventing the disconnection of the chain link from the lug 6 when the chain is slackened in the compression of the tire. In this form of my attachment, it is to be observed that the pull of the chain on the part of the attachment is largely in a radial direction, so that liability of loosening the attaching screws is minimized and shearing disruption of the threads of the rod 9 is likewise obviated.

In Figs. 4 and 5 of the drawing I have shown a slightly modified construction wherein the attachment is not constructed in relatively adjustable sections but is intended to be manufactured in a number of different sizes for application to wheels having fellies of different widths. In this modified form of the device, the end of the bar opposite to the terminal lug or post 6 thereof is formed with an inwardly projecting hook-shaped lug 21 which projects from the same face of said bar as the lug 6. The body bar 5 of this construction is provided upon each of its ends with an integral attaching plate or flange 7' to be secured to the side faces of the wheel felly. In all other respects the device shown in Figs. 4 and 5 is identical with that form of the invention illustrated in Figs. 1, 2 and 3. The operation of this modified construction which is quite similar to the operation above described will be readily understood from reference to Fig. 4 of the drawing. In the use of either form of the attachment, the tread chains are provided with straight terminal links, while the intermediate links of the chain are twisted in the usual manner of non-skid tire chains. The chains together with the attachments for the vehicle wheels may be supplied by the manufacturer of the machine, and the wheels may be equipped with the attachments when the machine is shipped from the factory. However, it is also apparent my improved chain attaching device can be separately marketed and sold by dealers in automobile accessories, and the device attached by the individual purchaser. The several transverse tread chains are independently secured or held in their operative positions across the tread of the tire, and when any one chain breaks, it can be quickly removed without affecting the operation of the remaining chains. In each form of the device, the spring held latch will effectively hold the chain in connection with the attaching device, and as the latch arm is disposed closely adjacent to the inner face of the wheel felly and independently of the outer side face of the wheel, it is not liable to be accidentally displaced, and the terminal link of the chain released from its engagement with the lug or post 6.

From the foregoing description taken in connection with the accompanying drawings the construction, manner of operation and several advantages of my invention will be clearly and fully understood. The device as a whole consists of relatively few parts which are of simple form and can therefore be manufactured at nominal cost. The attachment is also very durable and practical in use and not liable to get out of order, and when applied to the wheel is inconspicuous and in no wise detracts from the appearance of the wheel. I have herein shown and described the form and arrangement of the several elements which I have found to be satisfactory in practical use, but it is to be understood that for obvious reasons it may be desirable in some cases to make various mechanical changes in the device. I therefore reserve the privilege of adopting all such legitimate alterations in the form, proportion and construction of the elements as may be fairly embodied within the spirit and scope of the invention as claimed.

Having thus fully described my invention, what I desire to claim and secure by Letters Patent is:—

1. An attaching device for non-skid chains comprising a body bar adapted to be secured upon the inner face of a wheel felly, said bar having lugs at its opposite ends and with which the terminal links of a tread chain are adapted to be respectively engaged, and a spring held latch element mounted upon the body bar and movable in a plane in parallel relation to the plane of said bar, said latch element normally coacting with one of the lugs.

2. An attaching device for non-skid chains comprising a body bar adapted to be secured upon the inner face of a wheel felly, said bar having lugs at its opposite ends and with which the terminal links of a tread chain are adapted to be respectively engaged, a latch element having an arm provided with a stud on one end rotatably mounted in said bar, and a spring coacting with the latch element to yieldingly hold the other end of the arm normally in contact with one of said lugs.

3. An attaching device for non-skid chains comprising a body bar adapted to be secured upon the inner face of a wheel felly, said bar having lugs at its opposite ends extending at right angles to the body bar and radially of the wheel, said lugs being adapted to be respectively engaged by the terminal links of a tread chain, and means carried by the body bar and movable in a plane parallel with the plane of said bar to normally coact with one of said lugs and retain the chain link in connection therewith.

4. An attaching device for non-skid chains comprising a body bar adapted to be secured upon the inner face of a wheel felly, said bar having lugs at its opposite ends extending at right angles to the body bar and radially of the wheel, said lugs being adapted to be respectively engaged by the terminal links of a tread chain, one of said lugs being disposed opposite to one side face of the wheel felly and in spaced relation thereto, and the other lug projecting inwardly from the inner face of the wheel felly, and a spring held latch element rotatably mounted upon said bar and normally coacting with the latter lug to retain the terminal link of the tread chain in connection therewith.

5. An attaching device for non-skid chains comprising a body bar adapted to be secured to the inner face of a wheel felly, said bar having an angularly offset threaded end portion the other end of said bar being formed with an inwardly projecting, radially disposed lug, a hook-shaped lug having a threaded connection at one end to the threaded end of said bar and adapted to be adjusted thereon to engage against one side face of the wheel felly, said first named lug and the hook-shaped lug being adapted to be respectively engaged by the terminal links of the tread chain, and latch means mounted on the body bar to coact with said first named lug and retain the chain link in connection therewith.

In testimony whereof I hereunto affix my signature in the presence of two witnesses.

BARNEY F. KNOBLOCH.

Witnesses:
HOWARD H. KNOBLOCH,
LEONARD H. RORA.